United States Patent [19]

Hill et al.

[11] Patent Number: 5,401,449
[45] Date of Patent: Mar. 28, 1995

[54] METHOD OF MANUFACTURING A TRIM PANEL HAVING A STYLING LINE

[75] Inventors: Timothy W. Hill, Troy; Gerald J. Keller, Mt. Clemens, both of Mich.

[73] Assignee: General Motors Corporation, Detroit, Mich.

[21] Appl. No.: 89,542

[22] Filed: Jul. 12, 1993

[51] Int. Cl.⁶ .................... B29C 45/14; B29C 44/00
[52] U.S. Cl. .................... 264/46.4; 264/259; 264/273; 264/266; 156/245
[58] Field of Search .............. 156/245; 264/46.4, 46.6, 264/46.8, 259, 266, 46.5, 261, 263, 267, 273

[56] References Cited

U.S. PATENT DOCUMENTS

| | | | |
|---|---|---|---|
| 3,654,019 | 4/1972 | Cusick | 156/285 |
| 4,247,347 | 1/1981 | Lischer et al. | 264/46.8 |
| 4,374,885 | 2/1983 | Ikeda et al. | 264/321 |
| 4,676,938 | 6/1987 | Karklin et al. | 264/46.8 |
| 4,692,199 | 9/1987 | Kozlowski et al. | 156/245 |
| 4,766,025 | 8/1988 | Sanok et al. | 264/46.8 |
| 4,923,539 | 5/1990 | Spengler et al. | 156/245 |
| 4,996,090 | 2/1991 | Steinke et al. | 156/245 |
| 5,000,805 | 3/1991 | Lowe | 156/90 |
| 5,082,609 | 1/1992 | Rohrlach | 156/196 |
| 5,207,957 | 5/1993 | Heath et al. | 264/46.8 |
| 5,304,273 | 4/1994 | Kenrick et al. | 156/245 |

Primary Examiner—Allan R. Kuhns
Attorney, Agent, or Firm—George A. Grove

[57] ABSTRACT

An automotive door panel that has styling lines is made by laying a facing layer of soft trim material on a support surface of a mold part. The facing layer has a backing layer of open cell flexible foam that has gaps that expose strips on the back surface of the facing layer. A heat-sensitive adhesive barrier film is behind the flexible foam backing layer. The mold is closed by a mating mold part and a urethane precursor mixture is injected into the closed mold which is heated to generate a structural substrate. The generating substrate crushes the backing layer and activates the adhesive film to bond the structural substrate to the exposed back surface strips of the facing layer to provide the styling lines. These styling lines are enhanced when the foam backing layer recovers upon removal from the mold.

17 Claims, 2 Drawing Sheets

METHOD OF MANUFACTURING A TRIM PANEL HAVING A STYLING LINE

BACKGROUND OF THE INVENTION

This invention relates to covered trim panels, such as automotive door panels, that include foam cushions for a soft, luxurious feel and style lines for aesthetic appearance and more particularly to a method of making such trim panels.

Foam cushions and style lines are often combined in portions of an automotive door panel, typically in the upper portion of the door panel above an arm rest, because this area is easily seen and often touched.

One way to combine foam cushions and style lines in a particular area of an automotive door panel is by use of an insert that is made by dielectric fabrication techniques and attached to the automotive door panel. During manufacture, the foam cushion is placed on a dielectric board or other substrate which is compatible with the dielectric process, and then a soft, flexible trim material such as cloth, vinyl or leather is laid on top of the foam cushion. The cover material is then pushed against the dielectric board by a dielectric tool which compresses the foam cushion at the desired style line and bonds the cover material, the foam cushion and the dielectric board together.

One disadvantage of this method is that the method requires a dielectric board for a substrate which is relatively heavy when compared to structural urethane foam.

Another disadvantage of this method is that the method is relatively expensive from a manufacturing standpoint because the door panel and the insert are made in separate operations.

Still another disadvantage of this method is that the method is not practical and economical for producing an entire door panel that has only a selected area where the foam cushion and style lines are combined.

Still yet another disadvantage of this method is that the method cannot be used with a urethane substrate because urethane is not compatible with a dielectric process.

SUMMARY OF THE INVENTION

The object of this invention is to provide a unique method for making a trim panel such as an automotive door panel that has an area where a soft cushion is combined with style lines.

A feature and advantage of the method of the invention is that the method uses a low density substrate so that the resulting trim panel is lighter.

Another feature and advantage of the method of the invention is that method uses a substrate that is typically used for automotive door panels so that the entire door trim panel can be made in the same molding process.

Still another feature and advantage of the method of the invention is that method uses a low density reaction injection molded (RIM) substrate so that the soft styled area is not only lighter but also can be integrated into a single process for producing the entire door trim panel.

Yet another feature and advantage of the method of this invention is that a reaction injection molded substrate may be used that automatically compresses the foam cushion for creation of the desired style lines.

Still yet another feature and advantage of the method of this invention is that a reaction injection molded substrate may be used that automatically creates the heat required to bond the cover material to the substrate by the exothermic chemical reaction of the substrate components.

Still yet another feature and advantage of the method of this invention is that the semi-rigid urethane foam which inherently has good adhesive qualities for bonding to cover materials, particularly cloth, may be used as the substrate.

Still yet another feature and advantage of this invention is that styling lines can be incorporated into a trim panel that has a structural urethane foam substrate.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
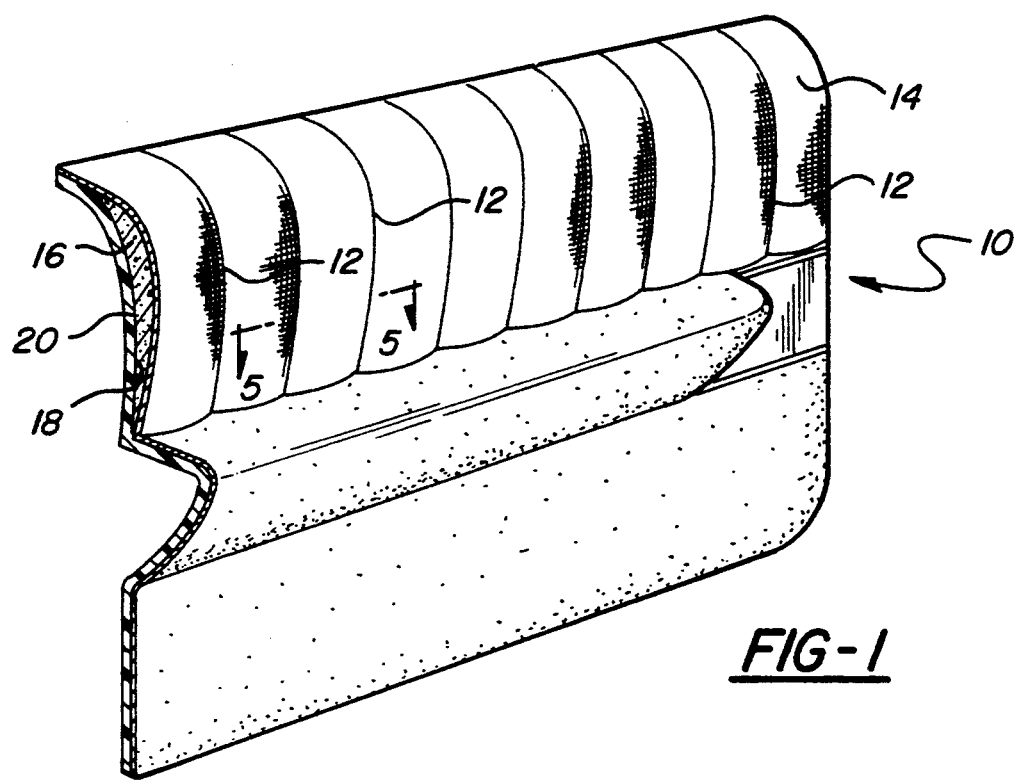
FIG. 1 is a perspective view of a trim panel for an automotive door that is made in accordance with the invention.

Referring now to the drawing, this invention relates to a method of manufacturing a trim panel, such as the automotive door panel 10, that has style lines 12 such as shown in FIG. 1. The automotive door panel 10 comprises a facing layer 14 of soft trim material, a backing layer 16 of open cell flexible foam, a heat-sensitive adhesive film 18, and a structural plastic substrate 20. The method of this invention is a one step molding process for fabricating the automotive door panel 10 so that the facing layer 14 of soft trim material has the integral style lines 12 as shown in FIG. 1.

Figure 2:
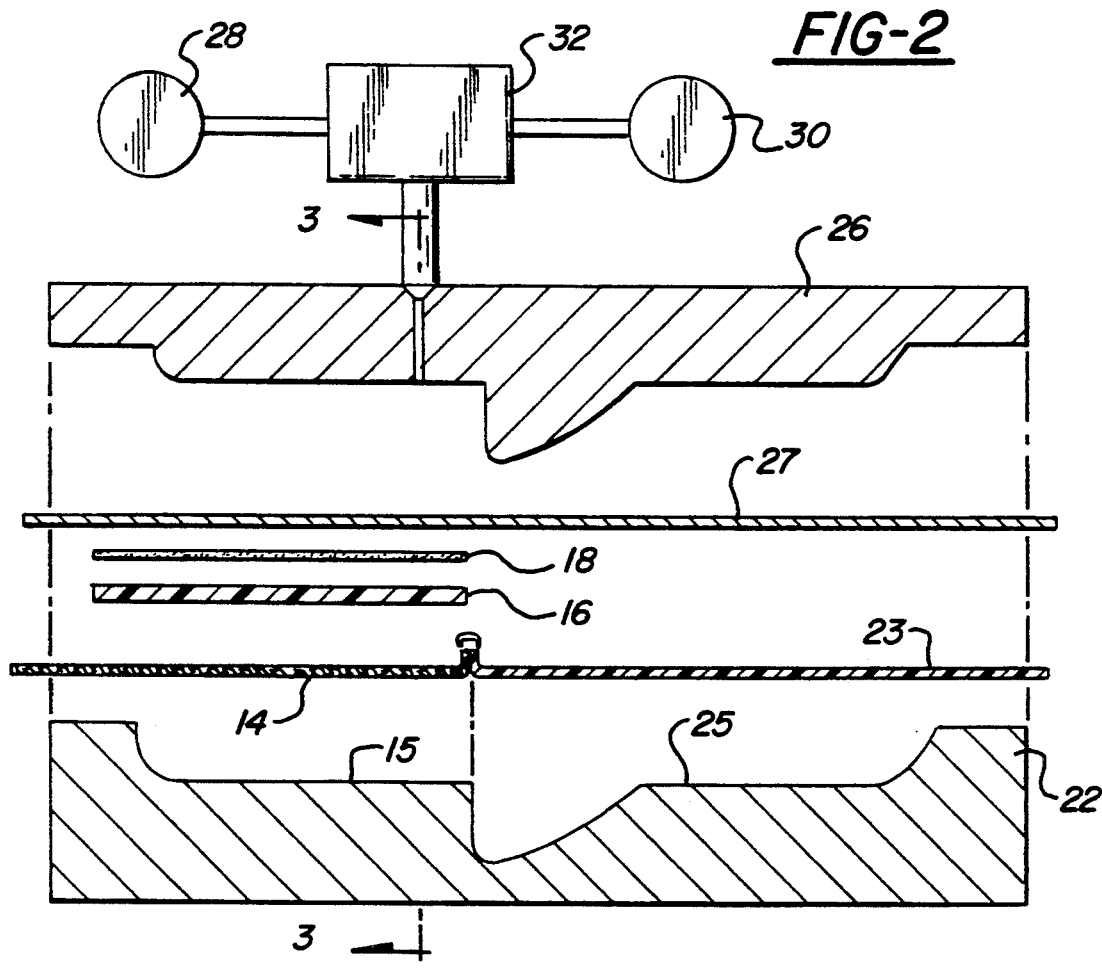
FIG. 2 is an exploded view of the trim panel of FIG. 1 in the process of being made in accordance with the invention.

The facing layer 14 can be made of any soft trim material such as cloth, leather or vinyl that has some degree of stretch or elasticity. This facing layer 14 is laid against a support surface 15 in a mold cavity of a lower mold part 22 as shown in FIG. 2. The exterior or front surface of the facing layer 14 is laid against the support surface.

Figure 3:
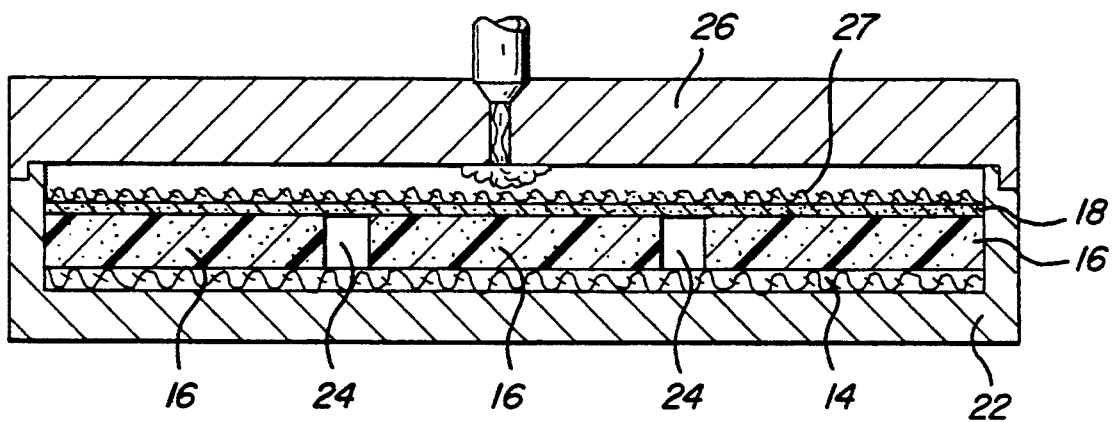
FIG. 3 is a transverse section of the trim panel taken substantially along the line 3—3 of FIG. 2 looking in the direction of the arrows.
Figure 4:
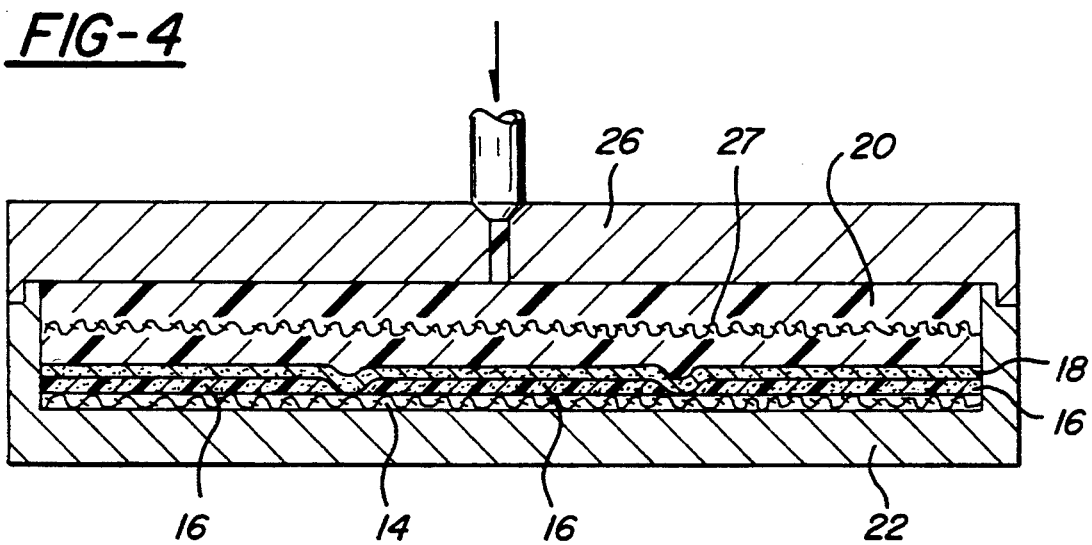
FIG. 4 is a transverse section of the trim panel at a later stage of manufacture.

The backing layer 16 of open cell flexible foam is then laid on the interior or back surface of the facing layer 14. In this instance, the backing layer 16 comprises a series of strips that are spaced apart to provide gaps 24 that expose a series of parallel strips on back surface of the facing layer 14 as shown in FIG. 3. The open cell flexible foam must have some unilateral stretch and good resiliency or crush recovery properties as explained below. A polyurethane foam is suitable and a thin layer of low density, i.e. about 0.20 inches thick and about 1.68 pounds per cubic foot, is preferred. The purpose of the flexible foam is to provide a foam cushion that gives a soft, luxurious feel. This is somewhat subjective, and consequently the thickness and density of the foam can be tailored to meet customer preference.

The heat-sensitive adhesive barrier film 18 is then laid on the backing layer 16. A suitable film is Platilon U 05, a polyester urethane coextruded film which is a two layer film available from Atochem Company of North America and which may be described as an ester-based thermoplastic polyurethane film. This film is impermeable, which is an important characteristic of the film. Consequently, the film 18 is not only an adhesive but also a barrier so that the urethane foam substrate 20 does not leak through into the open cell flexible foam layer 16 when the substrate 20 is being generated as described below. Such leakage would adversely affect the soft feel that is the primary function of the open cell flexible foam layer 16.

The facing layer 14, backing layer 16 and adhesive barrier film 18 can be laid on the support surface 15 of the lower mold part 22 sequentially as inferred above. However, the facing layer 14, backing layer 16 and adhesive barrier film 18 are preferably prelaminated and laid on the support surface in a single step. It is also possible to prelaminate the facing layer 14 and the backing layer 16 and use a separate adhesive barrier film 18. Even this limited prelamination is advantageous, particularly when the foam backing layer 16 is in several pieces.

After the three components are laid on the support surface 15 of the lower mold part 22, the molding process may be completed to make an insert that is physically attached to a door panel. However, the method of this invention lends itself to producing the entire door panel in one molding operation. When this option is used, a facing layer 23 of soft trim material is attached to the facing layer 14 edge-to-edge in any suitable manner and laid on the support surface 25 for the remaining part of the door panel 10. One suitable way of attaching the facing layers together in the mold is more fully explained in patent application Ser. No. 07/947,813, filed Sep. 21, 1992, now U.S. Pat. No. 5,304,273, and assigned to General Motors Corporation which is hereby incorporated into this patent specification by reference.

A reinforcement mat 27 is then placed on top of the adhesive barrier film 18 and the facing layer 23. This reinforcement mat 25 is preferably a fiberglass mat but any woven or non-woven long strand mat, such as aramid fibers, burlap, window screening or Kevlar, may be used.

In any event, the lower mold part 22 is closed by an upper mold part 26 after the several components are laid on the support surfaces of the lower mold part 22 as shown in FIGS. 2 and 3.

After the mold parts 22 and 26 are closed, the structural plastic substrate 20 is generated by combining polyol and isocyanate components 28 and 30 in a mixing head 32 and injecting the urethane precursor mixture into the mold so that it reacts to generate a structural semirigid urethane foam substrate. The generation of the structural urethane foam substrate creates pressure that crushes the backing layer 16 of flexible foam so that the substrate 20, the adhesive film 18 and the facing layer 14 are in intimate contact at the back surface strips that are exposed by the gaps 24 between the flexible foam strips of layer 16.

The generation of the structural urethane foam substrate 20 is an exothermic chemical reaction that raises the temperature of the urethane foam to about 400° F. This creates sufficient heat to activate the adhesive barrier film 18 and bond the structural urethane foam substrate 20 to the back surface strips of the facing layer 14 that are exposed by the gaps in the soft foam backing layer 16. This adhesion of the facing layer 14 to the substrate 20 at the exposed back surfaces creates the styling lines 12 shown in FIGS. 1 and 5.

The molds pans 22 and 26 are heated in a conventional manner so that the lower mold part 22 supporting the soft trim layers 14, 16 and 18 has a temperature in the range of about 130° F. to about 150° F. and the upper mold part 26 next to the structural substrate 20 has a temperature of about 150° F. The lower mold part 22 is preferably heated to a temperature above 130° F. to increase the strength of the adhesive bond between the structural urethane substrate 20 and the facing layer 14.

Figure 5:
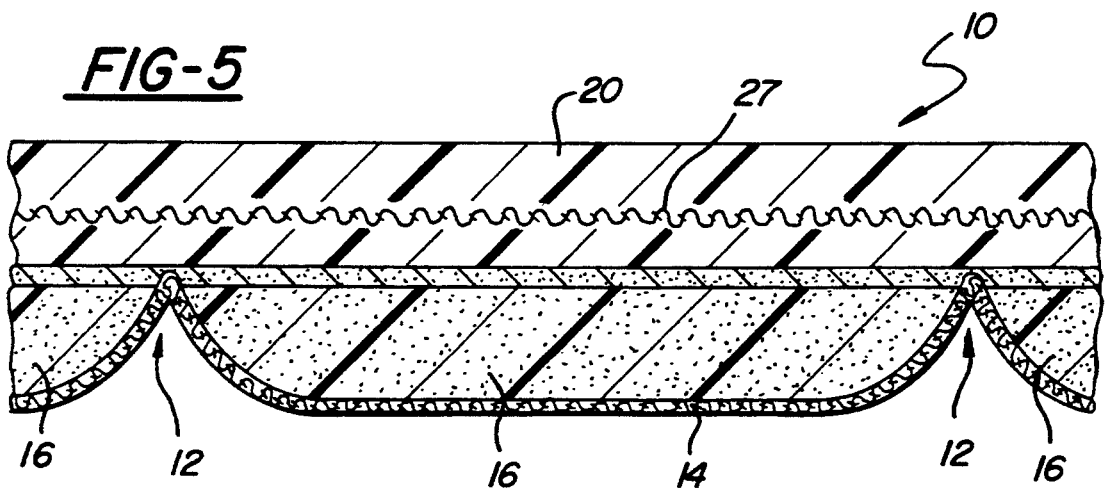
FIG. 5 is a transverse section of the trim panel taken substantially along the line 5—5 of FIG. 1 looking in the direction of the arrows.

The styling lines 12 themselves are enhanced when the door panel 10 is cured and taken out of the mold and the thin backing layer 16 of flexible foam recovers as best shown in FIG. 5. In this regard, a flexible foam that recovers to a minimum of about 80% of its original height should be selected.

An example of a suitable low density structural reaction injection molded (SRIM) urethane foam for the substrate is the Rimline XLS—89000 system that is available from the ICI Polyurethanes Group of ICI Americas, Inc., having a place of business in Sterling Heights, Mich., which has a molded density in the range of 28 to 35 pounds per cubic foot and a reinforcement mat of fiberglass or any woven or non-woven long strand mat material as indicated earlier. A reinforced reaction injection molded (RRIM) semirigid urethane foam, that is one is filled with particles, such as milled fiberglass particles or Wallastonite ®, rather than combined with a mat for reinforcement, may also be used as the structural substrate. Use of other reaction injection molded substrate materials is possible and use of an injection molded substrate may also be possible.

While the method of this invention has been described in connection with producing style lines in a automotive door panel, the method may also be used to create other decorative patterns including lettering in any trim panel that has a facing layer of soft material that is backed by a flexible foam layer.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of manufacturing a trim panel having a soft cushion and a styling line combined with the soft cushion comprising the steps of:
providing a facing layer of soft trim material adjacent a backing layer of open cell flexible foam that has a gap,
providing a heat sensitive adhesive barrier film adjacent the backing layer so that the gap exposes a back surface of the facing layer to the heat sensitive adhesive barrier film, laying the facing layer, the backing layer and the heat sensitive adhesive barrier film on a support surface in a mold, and injecting a urethane precursor mixture into the mold to generate a structural substrate for the trim panel, the generation of the structural substrate creating sufficient pressure to crush the backing layer so that the substrate is in intimate contact with the heat sensitive adhesive barrier film and the facing layer, and the generation of the structural substrate creating sufficient heat to activate the heat sensitive adhesive barrier film to bond the structural substrate to the back surface of the facing layer that is exposed by the gap of the backing layer to create a styling line in the facing layer.

2. The method of manufacturing a trim panel having a soft cushion and a styling line combined with the soft cushion as defined in claim 1 wherein the open cell flexible foam of the backing layer has unilateral stretch and good resiliency so that the backing layer recovers to enhance the styling line when the trim panel is removed from the mold.

3. The method of manufacturing a trim panel having a soft cushion and a styling line combined with the soft cushion as defined in claim 1 wherein the open cell flexible foam of the backing layer has unilateral stretch and good resiliency so that the backing layer recovers to a minimum of about 80% of its original height to enhance the styling line when the trim panel is removed from the mold.

4. The method of manufacturing a trim panel having a soft cushion and a styling line combined with the soft cushion as defined in claim 1 wherein the structural substrate generated by the urethane precursor materials is a semirigid foam.

5. The method of manufacturing a trim panel having a soft cushion and a styling line combined with the soft cushion as defined in claim 2 wherein the structural substrate generated by the urethane precursor materials is a semirigid foam.

6. The method of manufacturing a trim panel having a soft cushion and a styling line combined with the soft cushion as defined in claim 1 wherein the structural substrate generated by the urethane precursor materials is a low density semirigid foam having a molded density in the range of about 28 to 35 pounds per cubic foot.

7. The method of manufacturing a trim panel having a soft cushion and a styling line combined with the soft cushion as defined in claim 1 wherein the mold that supports the facing layer, the backing layer and the heat-sensitive adhesive barrier film is heated to a temperature above 130° F. to increase the strength of the adhesive bond between the structural substrate and the facing layer.

8. A method of manufacturing a trim panel having a soft cushion and a styling line combined with the soft cushion comprising the steps of:

providing a facing layer of soft trim material adjacent a backing layer of flexible foam that has a gap, providing a heat sensitive adhesive barrier film adjacent the backing layer so that the gap exposes a back surface of the facing layer to the heat sensitive adhesive barrier film, laying the facing layer, the backing layer and the heat sensitive adhesive barrier film on a support surface in a mold, and injecting a foam precursor mixture into the mold to generate a structural substrate for the trim panel, the generation of the structural substrate creating sufficient pressure to crush the backing layer so that the substrate is in intimate contact with the heat sensitive adhesive barrier film and the facing layer, and creating sufficient heat to activate the heat sensitive adhesive barrier film to bond the structural substrate to the back surface of the facing layer that is exposed by the gap of the backing layer to create a styling line in the facing layer.

9. The method of manufacturing a trim panel having a soft cushion and a styling line combined with the soft cushion as defined in claim 8 wherein the flexible foam of the backing layer recovers to enhance the styling line when the trim panel is removed from the mold.

10. The method of manufacturing a trim panel having a soft cushion and a styling line combined with the soft cushion as defined in claim 8 wherein the structural substrate generated by the foam precursor materials is a low density semirigid foam.

11. The method of manufacturing a trim panel having a soft cushion and a styling line combined with the soft cushion as defined in claim 9 wherein the structural substrate generated by the foam precursor materials is a low density semirigid foam having a molded density in the range of about 28 to 35 pounds per cubic foot.

12. The method of manufacturing a trim panel having a soft cushion and a styling line combined with the soft cushion as defined in claim 8 wherein the mold that supports the facing layer, the backing layer and the heat-sensitive adhesive barrier film is heated to increase the strength of the adhesive bond between the structural substram and the facing layer.

13. A method of manufacturing a trim panel having a soft cushion and a styling line combined with the soft cushion comprising the steps of:

providing a facing layer of soft trim material adjacent a backing layer of flexible foam that has a gap, providing a heat sensitive adhesive barrier film adjacent the backing layer so that the gap exposes a back surface of the facing layer to the heat sensitive adhesive barrier film, laying the facing layer, the backing layer and the heat sensitive adhesive barrier film on a support surface in a mold, and injecting a structural plastic into the mold to generate a structural substrate for the trim panel and crush the backing layer so that the substrate is in intimate contact with the heat sensitive adhesive barrier film and the facing layer, and creating sufficient heat to activate the heat sensitive adhesive barrier film to bond the structural substrate to the back surface of the facing layer that is exposed by the gap of the backing layer to create a styling line in the facing layer.

14. The method of manufacturing a trim panel having a soft cushion and a styling line combined with the soft cushion as defined in claim 13 wherein the flexible foam of the backing layer recovers to enhance the styling line when the trim panel is removed from the mold.

15. The method of manufacturing a trim panel having a soft cushion and a styling line combined with the soft cushion as defined in claim 13 wherein the structural substrate generated is a low density plastic.

16. A method of manufacturing a trim panel having a soft cushion and a styling line combined with the soft cushion comprising the steps of:

providing a facing layer of soft trim material, providing a backing layer of flexible foam adjacent only a portion of the facing layer, the backing layer having a gap, providing a heat-sensitive adhesive barrier film adjacent the backing layer so that the gap exposes a back surface of the facing layer to the heat-sensitive adhesive barrier film, laying the facing layer, the backing layer and the heat-sensitive adhesive barrier film on a support surface in a mold, injecting a structural plastic into the mold to generate a structural substrate for the trim panel and crush the backing layer so that the substrate is in intimate contact with the heat-sensitive adhesive barrier film and the facing layer, and creating sufficient heat to activate the heat-sensitive adhesive barrier film to bond the structural substrate to the back surface of the facing layer that is exposed by the gap of the backing layer to create a styling line in the facing layer.

17. A method of manufacturing a trim panel having a soft cushion and a styling line combined with the soft cushion as defined in claim 16 wherein the facing layer comprises a first panel of soft trim material that has the styling line and a second panel of soft trim material that is attached to the first panel and the backing layer is adjacent the first panel.

* * * * *